US007643593B1

(12) United States Patent  (10) Patent No.: US 7,643,593 B1
Macomber  (45) Date of Patent: Jan. 5, 2010

(54) SYSTEM AND METHOD FOR READ DATA RECOVERY IN A SERIAL INTERFACE (75) Inventor: Robert L. Macomber, Portland, ME (US)

(73) Assignee: National Semiconductor Corporation, Santa Clara, CA (US)

( * ) Notice: Subject to any disclaimer, the term of this patent is extended or adjusted under 35 U.S.C. 154(b) by 436 days.

(21) Appl. No.: 11/250,591

(22) Filed: Oct. 14, 2005

(51) Int. Cl.
H04B 1/16 (2006.01)
H04L 7/00 (2006.01)

(52) U.S. Cl. .................. 375/355; 455/255; 455/259; 455/208

(58) Field of Classification Search ................. 375/355, 375/362, 354, 359, 371, 373; 455/502, 208, 455/550.1, 259, 260, 130, 230, 255
See application file for complete search history.

(56) References Cited

U.S. PATENT DOCUMENTS

| 5,357,425 | A * | 10/1994 | Minto ......................... 700/73 |
| 5,528,637 | A * | 6/1996 | Sevenhans et al. ........... 375/371 |
| 6,941,484 | B2 * | 9/2005 | To et al. ..................... 713/500 |
| 7,076,377 | B2 * | 7/2006 | Kim et al. ..................... 702/66 |
| 7,099,424 | B1 * | 8/2006 | Chang et al. ................. 375/370 |
| 7,197,098 | B2 * | 3/2007 | Johnson ....................... 375/371 |
| 7,200,195 | B2 * | 4/2007 | Amano ....................... 375/355 |
| 7,231,009 | B2 * | 6/2007 | Kim et al. ................... 375/354 |
| 2005/0163207 | A1 * | 7/2005 | Buckwalter et al. ......... 375/229 |
| 2005/0180498 | A1 * | 8/2005 | Bhakta et al. ............... 375/233 |
| 2006/0078078 | A1 * | 4/2006 | Moriizumi ................... 375/373 |
| 2007/0232254 | A1 * | 10/2007 | Mackey et al. ........... 455/343.1 |

OTHER PUBLICATIONS

J. Goldie, National Semiconductor Application Note 1311 (MPL PHY Layer Overview, Jan. 2004)J.*
"Mobile Pixel Link Level-0", 2004 National Semiconductor Corporation, 23 pages.
"LM2502, Mobile Pixel Link (MPL) Display Interface Serializer and Deserializer", National Semiconductor Corporation, Aug. 2005, 27 pages.

* cited by examiner

Primary Examiner—Sonny Trinh (57) ABSTRACT

A method for recovering data includes generating a plurality of out-of-phase clock signals. The method also includes generating samples of an incoming data signal, where a plurality of samples are generated using each of the plurality of clock signals. The method further includes selecting one of the plurality of clock signals and providing the samples generated using the selected clock signal. The incoming data signal may be received over a serial interface that includes a clock line for transporting a main clock signal. The out-of-phase clock signals could be approximately 0°, 90°, 180°, and 270° out-of-phase with respect to the main clock signal. The out-of-phase clock signals could be used to clock different registers that sample the incoming data signal. The selected clock signal could be selected by identifying a transition that occurs between samples associated with two of the clock signals and then selecting another of the clock signals.

21 Claims, 5 Drawing Sheets

SYSTEM AND METHOD FOR READ DATA RECOVERY IN A SERIAL INTERFACE

TECHNICAL FIELD

This disclosure is generally directed to serial interfaces and more specifically to a system and method for read data recovery in a serial interface.

BACKGROUND

Mobile Pixel Link Level Zero ("MPL Level-0") is a specification that defines the electrical connections, clocking, and bit order for serial video interfaces. Among other things, the MPL Level-0 specification defines a master-slave, point-to-point, bidirectional serial interface between a processor and a display. The MPL Level-0 specification may be implemented in mobile handheld devices or other devices. The MPL Level-0 specification provides several advantages, including a reduced number of wires in the interface, reduced power consumption, and reduced electro-magnetic interference.

The MPL Level-0 serial interface defines physical lines for carrying a clock signal (denoted "MC") and one or more data signals (denoted "MD"). The MC clock signal is sent from the master to the slave. Write data is sent from the master to the slave, and the slave uses both rising and falling edges of the MC clock signal to recover the write data. Read data is sent from the slave to the master, where the slave uses the rising edges of the MC clock signal to transmit the read data.

Read data sent from the slave is recovered at the master by sampling any signals on the MD data lines. However, the arrival time of the read data sent from the slave to the master is variable. Also, the period of the MC clock signal can have a wide range of values. This may make it difficult to sample the read data at the master using a single static MC clock signal. One prior approach to solving this problem is to over-sample the read data at the master. For example, the master could sample the read data using an internal clock that has twice the frequency of the MC clock signal. This allows for over-sampling of the MD data signals and recovery of the read data.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
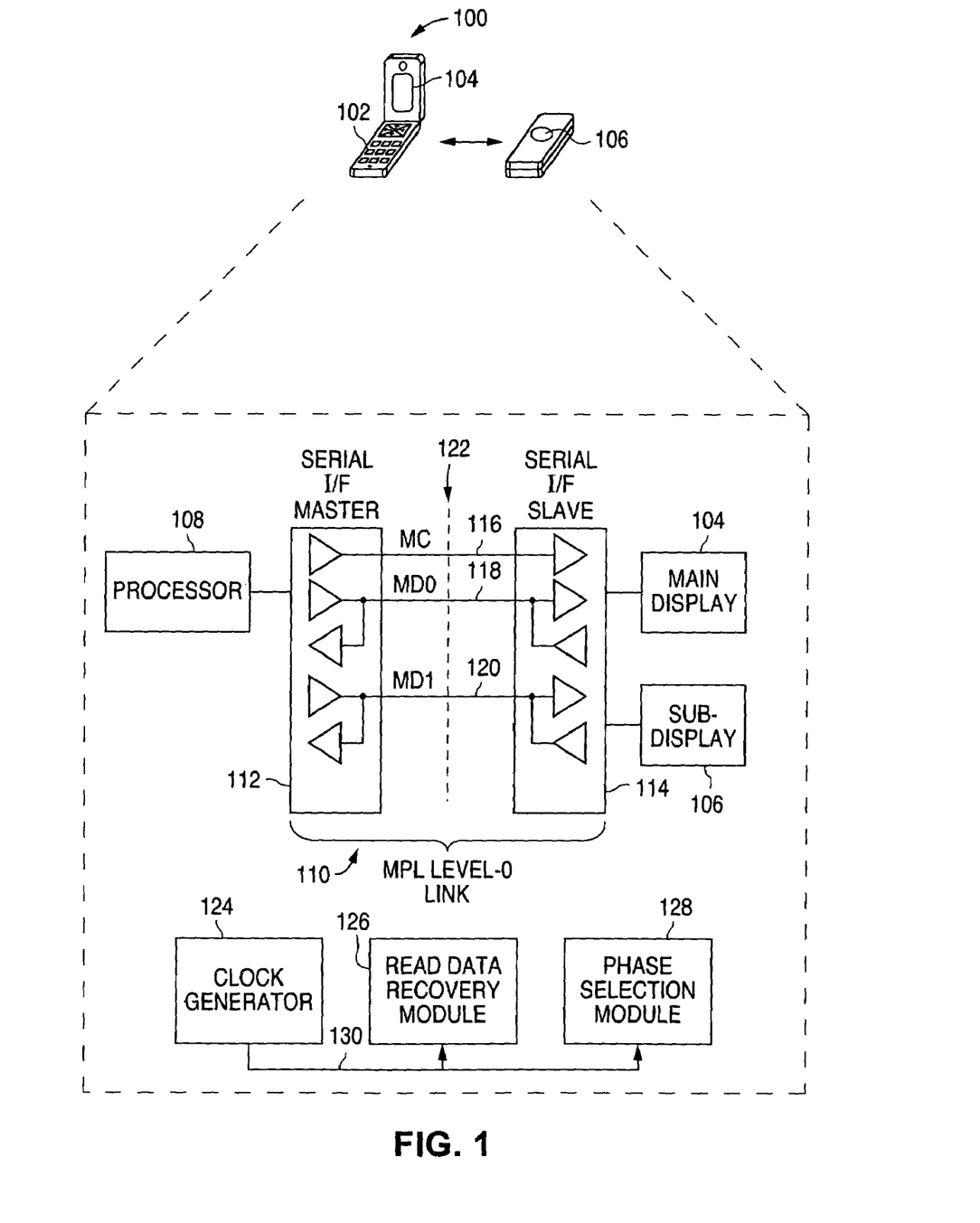
FIG. 1 illustrates an example mobile device having a serial interface according to one embodiment of this disclosure.

FIG. 1 illustrates a mobile device 100 having a serial interface according to one embodiment of this disclosure. The embodiment of the mobile device 100 shown in FIG. 1 is for illustration only. Other embodiments of the mobile device 100 may be used without departing from the scope of this disclosure.

In this example embodiment, the mobile device 100 represents a mobile telephone. As shown in FIG. 1, the mobile device 100 represents a "flip-type" mobile telephone capable of being opened and closed. Opening the mobile device 100 reveals buttons 102 and a main display 104. When closed, a sub-display 106 remains visible to a user. In this example, the buttons 102 may be used by the user to dial a telephone number, accept an incoming call, access voice messages, modify operating parameters of the mobile device 100, or perform any other or additional functions. Also, the main display 104 could display any suitable information to the user, such as the telephone number being dialed by the user, caller identification information for an incoming call, a current date and time, or the power level of a battery. In addition, the sub-display 106 could provide any suitable information to the user, such as caller identification information for an incoming call. The buttons 102 represent any suitable structures capable of selection by the user. Each of the displays 104-106 represents any suitable display, such as a thin film transistor (TFT) liquid crystal display (LCD).

The items within the dashed lines of FIG. 1 represent additional arrangements within the mobile device 100. In this example, the mobile device 100 also includes a processor 108. The processor 108 may perform any of a wide variety of functions in the mobile device 100. For example, the processor 108 may perform functions allowing the user of the mobile device 100 to place an outgoing call or receive an incoming call. The processor 108 may also transmit information to the displays 104-106 for presentation to the user. The processor 108 represents any suitable processor or controller in the mobile device 100. The processor 108 could, for example, represent a baseband processor or an application processor.

The mobile device 100 further includes a serial interface 110 linking the processor 108 and the displays 104-106. In this example, the serial interface 110 represents an MPL Level-0 serial interface. The MPL Level-0 interface includes a serial interface master module 112 and a serial interface slave module 114. The master module 112 and the slave module 114 are linked by a clock line 116 and two data lines 118-120. The clock line 116 transports a clock signal (denoted "MC") from the master module 112 to the slave module 114. The data lines 118-120 (denoted "MD1" and "MD2") are bi-directional lines that transport data signals between the master module 112 and the slave module 114. The master module 112 and the slave module 114 each include any suitable logic for supporting a serial interface.

As shown in FIG. 1, a line 122 denotes a possible separation of the components in the mobile device 100. For example, the processor 108 and the master module 112 could reside in the lower portion of the mobile device 100 when the mobile device 100 is opened. The slave module 114 and the displays 104-106 could reside in the upper portion of the mobile device 100 when the mobile device 100 is opened. In these embodiments, the serial interface 110 provides a simple mechanism for transporting data between the processor 108 and the displays 104-106 across the boundary of the upper and lower portions of the mobile device 100.

In one aspect of operation, write data is sent from the master module 112 to the slave module 114 over the data lines 118-120. The slave module 114 uses the MC clock signal sent over the clock line 116 to recover the write data, such as by using both rising and falling edges of the MC clock signal to recover the write data. Read data is sent from the slave module 114 to the master module 112 over the data lines 118-120. The slave module 114 uses the MC clock signal received over the clock line 116 to transmit the read data, such as by transmitting read data at every rising edge of the MC clock signal. The master module 112 then recovers the read data sent over the data lines 118-120.

One prior approach to recovering the read data at the master module 112 involves over-sampling the read data. For example, the master module 112 could sample the read data using an internal clock. The internal clock could have twice the frequency of the MC clock signal. This allows the master module 112 to over-sample the MD data signals and recover the read data.

This disclosure provides another technique for recovering read data at the master module 112. According to this technique, the mobile device 100 uses a clock generator 124, a read data recovery module 126, and a phase selection module 128 to recover the read data. While these components 124-128 are shown in FIG. 1 as residing outside of the master module 112, one or more of these components 124-128 could reside within the master module 112 or in any other suitable location(s).

In this example, the clock generator 124 generates multiple clock signals 130. The clock signals 130 may have the same or approximately the same frequency as the MC clock signal, and the clock signals 130 are out-of-phase with each other. For example, four clock signals 130 may be 0°, 90°, 180°, and 270° out-of-phase with the MC clock signal. In some embodiments, the clock signal 130 that is 0° out-of-phase with the MC clock signal actually is the MC clock signal and is transmitted over the clock line 116. The clock generator 124 includes any suitable structure for generating multiple out-of-phase clock signals 130.

Figure 2:
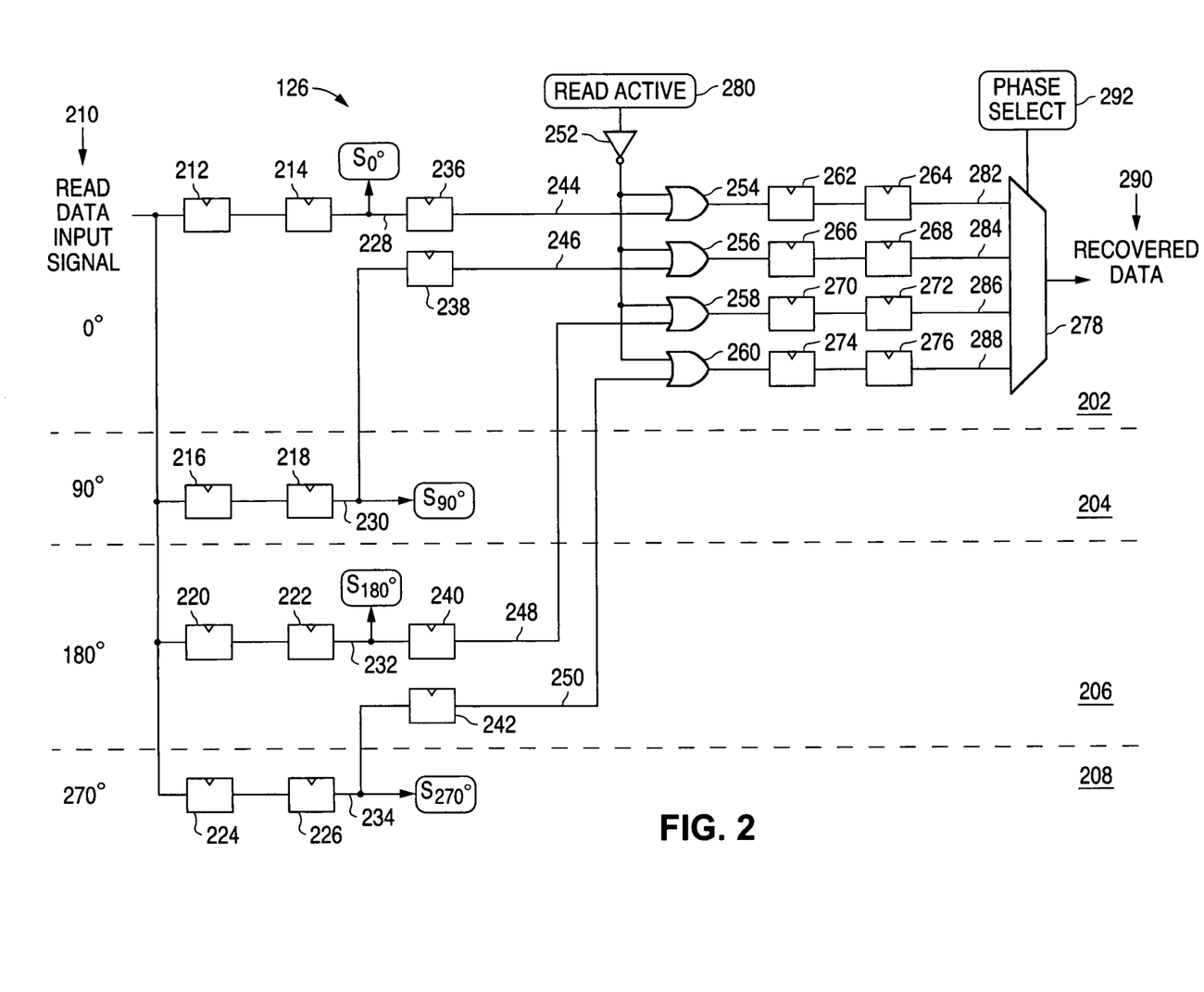
FIG. 2 illustrates an example read data recovery module for recovering read data sent across a serial interface according to one embodiment of this disclosure.
Figure 3:
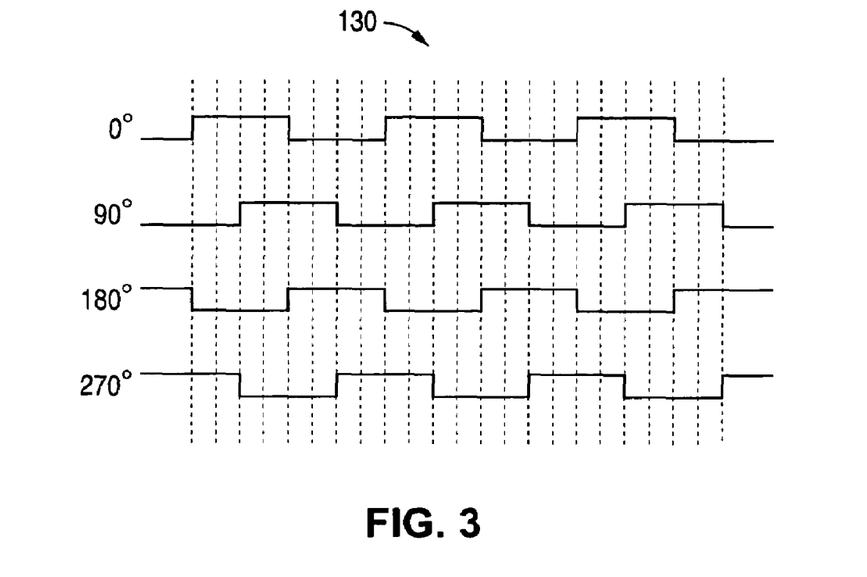
FIG. 3 illustrates example four-phase clock signals used to recover read data sent across a serial interface according to one embodiment of this disclosure.

The clock signals 130 are provided to the read data recovery module 126 and the phase selection module 128. The read data recovery module 126 attempts to recover the read data from the slave module 114 using each of the clock signals 130. For example, the read data recovery module 126 could include multiple pipelines, where each pipeline attempts to recover the read data using a different one of the clock signals 130. This allows the read data from the slave module 114 to be sampled at different times within a single period of the MC clock signal. One phase of the clock signals 130 (meaning one of the clock signals 130) is then selected, and the read data recovered using that clock signal 130 is output to the processor 108. The read data recovery module 126 includes any suitable structure for recovering read data using multiple out-of-phase clock signals 130. One example embodiment of the read data recovery module 126 is shown in FIG. 2, which is described below. One example of the clock signals 130 used by the read data recovery module 126 is shown in FIG. 3, which is described below.

Figure 4A:
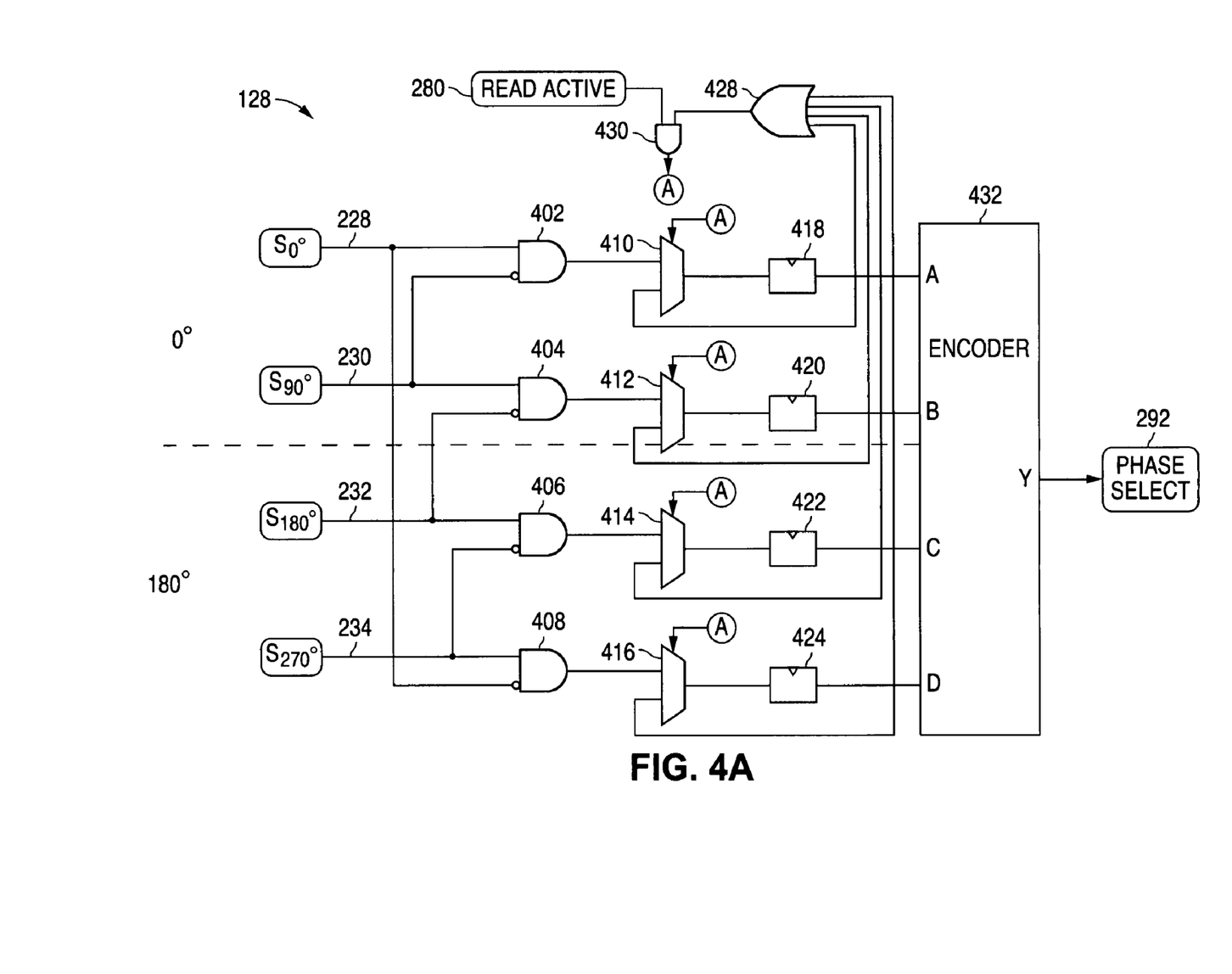
FIGS. 4A through 4C illustrate an example phase selection module for selecting a clock phase used to recover read data sent across a serial interface according to one embodiment of this disclosure.
Figure 4B:
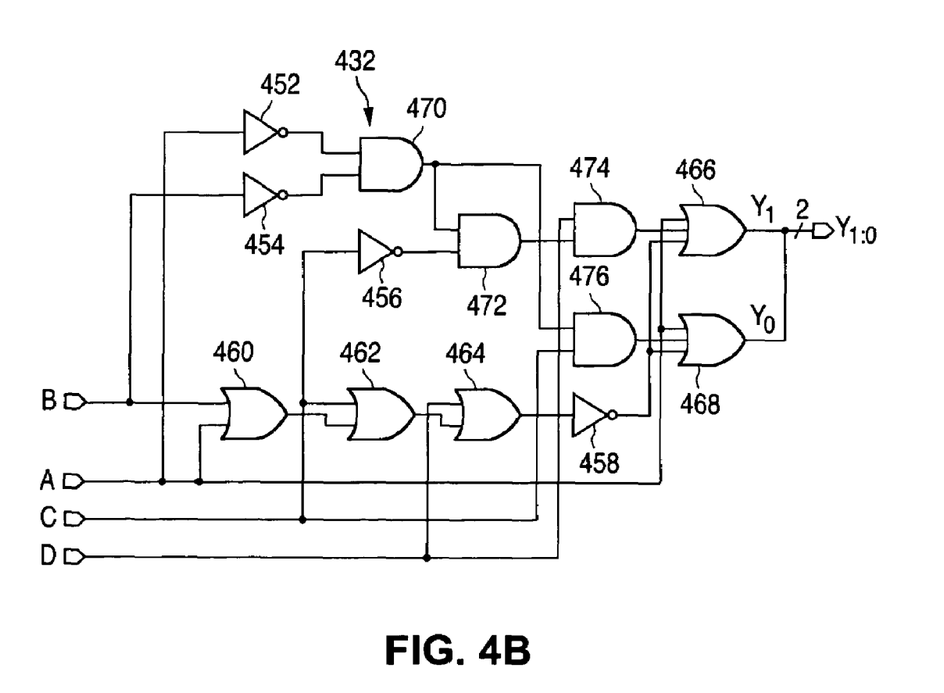
Figure 4C:
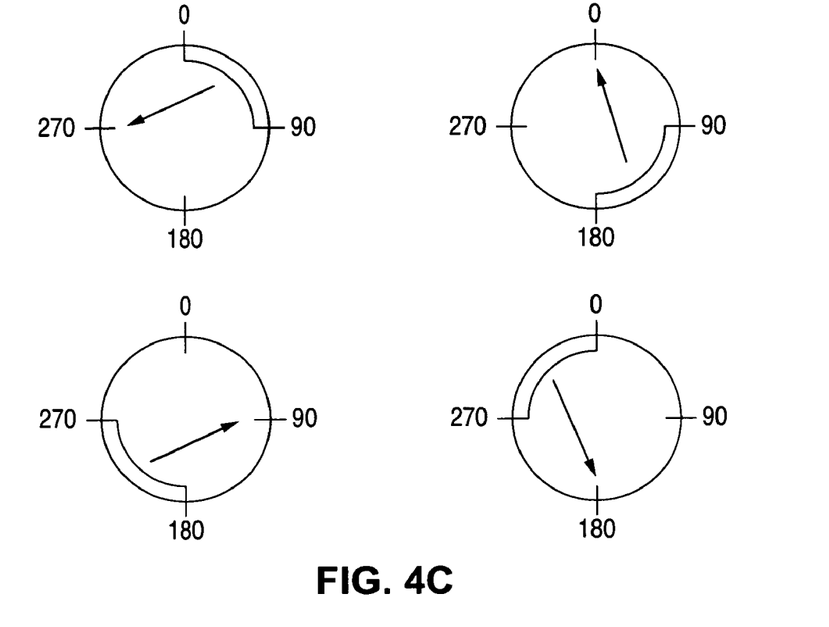

The phase selection module 128 selects the most appropriate phase of the clock signals 130 to be used to recover the read data. For example, the phase selection module 128 may select one of the out-of-phase clock signals 130, which may be associated with one of the pipelines in the read data recovery module 126. The read data recovered by that pipeline is then output to the processor 108. The phase selection module 128 includes any suitable structure capable of selecting a clock phase to be used to recover read data. One example embodiment of the phase selection module 128 is shown in FIGS. 4A through 4C, which are described below.

Although FIG. 1 illustrates one example of a mobile device 100 having a serial interface, various changes may be made to FIG. 1. For example, while the mobile device 100 is illustrated as a mobile telephone, the mechanism for read data recovery described above could be used in any other suitable mobile or other device. Also, the mobile device 100 could include only one of the displays 104-106 or more than two displays. Further, while shown as having two data lines 118-120, the serial interface 110 could include a single data line or more than two data lines. In addition, the functional division shown in FIG. 1 is for illustration only. Various components in FIG. 1 could be omitted, combined, or further subdivided according to particular needs.

FIG. 2 illustrates an example read data recovery module 126 for recovering read data sent across a serial interface according to one embodiment of this disclosure. The embodiment of the read data recovery module 126 shown in FIG. 2 is for illustration only. Other embodiments of the read data recovery module 126 may be used without departing from the scope of this disclosure. Also, for ease of explanation, the read data recovery module 126 is described as operating in the mobile device 100 of FIG. 1. The read data recovery module 126 could be used in any other suitable device.

In this example embodiment, the read data recovery module 126 includes four pipelines 202-208 that receive a read data input signal 210. The read data input signal 210 contains read data provided by the serial interface slave module 114 over one data line. Each of the pipelines 202-208 sample the read data input signal 210 to recover the read data, but the pipelines 202-208 are clocked by different out-of-phase clock signals 130. For example, the pipeline 202 is clocked by the clock signal 130 that is 0° out-of-phase with the MC clock signal, and the pipeline 204 is clocked by the clock signal 130 that is 90° out-of-phase with the MC clock signal. The pipeline 206 is clocked by the clock signal 130 that is 180° out-of-phase with the MC clock signal, and the pipeline 208 is clocked by the clock signal 130 that is 270° out-of-phase with the MC clock signal.

As shown in FIG. 2, the first two stages of the pipelines 202-208 are formed from registers 212-226. Each of the pipelines 202-208 sends the read data input signal 210 through two of the registers 212-226. Each register is clocked by the clock signal 130 associated with the pipeline in which the register resides. For example, registers 212-214 are clocked by the 0° clock signal 130, registers 216-218 are clocked by the 90° clock signal 130, registers 220-222 are clocked by the 180° clock signal 130, and registers 224-226 are clocked by the 270° clock signal 130. The registers 212-226 operate to create stable samples of the read data input signal 210, and the stable samples are further processed in the pipelines 202-208.

The registers 214, 218, 222, and 226 produce signals 228-234, respectively. The signals 228-234 are provided to the phase selection circuit 128 shown in FIGS. 4A through 4C. The signals 228-234 are also provided to the third stage of the pipelines 202-208. The third stage of the pipelines 202-208 is formed from registers 236-242. The registers 236-242 sample the signals 228-234 and synchronize the signals 228-234 to two of the clock signals 130. As shown in FIG. 2, the registers 236-238 are clocked by the 0° clock signal 130, and the registers 240-242 are clocked by the 180° clock signal 130. This synchronizes each of the signals 228-234 to either the 0° clock signal 130 or the 180° clock signal 130.

The registers 236-242 produce signals 244-250, respectively. The signals 244-250 are provided to the final stages of the pipelines 202-208. The final stages of the pipelines 202-208 are formed from an inverter 252, OR gates 254-260, registers 262-276, and a multiplexer 278. The inverter 252 receives and inverts a read active signal 280. When a read is not occurring, the read active signal 280 may have a low logic value. Inverting the read active signal 280 produces a high logic value that propagates through the OR gates 254-260, the registers 262-276, and the multiplexer 278, and the multiplexer 278 outputs a constant high logic value. When a read is occurring, the read active signal 280 may have a high logic value. Inverting the read active signal 280 produces a low logic value, allowing the OR gates 254-260, the registers 262-276, and the multiplexer 278 to output recovered read data.

The OR gates 254-260 receive the inverted read active signal 280 and the signals 244-250 from the registers 236-242. Outputs of the OR gates 254-260 are sampled by the registers 262-276, which are clocked by the 0° clock signal 130. The registers 264, 268, 272, and 276 produce signals 282-288, which represent the read data recovered using the 0°, 90°, 180°, and 270° clock signals 130, respectively. One of the signals 282-288 is then selected by the multiplexer 278 and output as recovered read data 290. The multiplexer 278 is controlled by a phase select signal 292, which is provided by the phase selection circuit 128 of FIGS. 4A through 4C. The phase select signal 292 controls which of the signals 282-288 is output as the recovered read data 290. The phase select signal 292 could, for example, represent a two-bit signal.

In one aspect of operation, the registers 212-226 sample the read data input signal 210, where the samples are taken using all four clock phases (0°, 90°, 180°, and 270°). The samples for all four clock phases are then synchronized to two of the clock phases (0° and 180°), which may help to avoid one-quarter cycle timing paths in subsequent logic. If the read active signal 280 indicates a read is occurring, the synchronized samples for all four clock phases are then propagated through the OR gates 254-260 and sampled by the registers 262-276. Based on the decision of the phase selection circuit 128, the samples for one of the four clock phases are output as the recovered read data 290. In this way, read data may be recovered using clock signals 130 with different phases, and the read data for the appropriate phase is output to the processor 108.

The circuit of the read data recovery module 126 shown in FIG. 2 could be provided for each data line in a serial interface. For example, the serial interface 110 in FIG. 1 includes two data lines 118-120. In this example, two copies of the circuit shown in FIG. 2 could be used, one for each of the data lines 118-120. Also, a single phase select signal 292 could be generated using one of the data lines 118-120, and the single phase select signal 292 could be used by both copies of the circuit shown in FIG. 2. In other embodiments, a phase select signal 292 could be generated using each of the data lines 118-120, where each copy of the circuit shown in FIG. 2 uses a different phase select signal 292.

Each of the registers in FIG. 2 includes any suitable structure for sampling a signal, such as a latch or D flip-flop. The inverter 252 includes any suitable structure for inverting a signal. Each of the OR gates 254-260 includes any suitable structure for performing logical OR operations. The multiplexer 278 includes any suitable structure for selecting one of multiple inputs for output.

Although FIG. 2 illustrates one example of a read data recovery module 126 for recovering read data sent across a serial interface, various changes may be made to FIG. 2. For example, the logic shown in FIG. 2 is for illustration only. Other logic could also be used in the read data recovery module 126. Also, the use of the inverter 252 may not be required if the read active signal 280 is low during read operations. Further, a different number of pipelines could be used in the read data recovery module 126. Beyond that, the pipelines 202-208 are shown as being clocked by the 0°, 90°, 180°, and 270° clock signals 130, respectively. The 0°, 90°, 180°, and 270° clock signals 130 could be distributed among the pipelines 202-208 in any other suitable manner. In addition, the functional division shown in FIG. 2 is for illustration only. Various components in FIG. 2 could be omitted, combined, or further subdivided according to particular needs.

FIG. 3 illustrates example four-phase clock signals 130 used to recover read data sent across a serial interface according to one embodiment of this disclosure. The clock signals 130 shown in FIG. 3 are for illustration only. Other clock signals may be used without departing from the scope of this disclosure. Also, for ease of explanation, the clock signals 130 are described as being used in conjunction with the read data recovery module 126 of FIG. 2 within the mobile device 100 of FIG. 1. The clock signals 130 could be used in any other suitable module and in any other suitable device.

In this example, the clock signals are generally square waves with a fifty-percent duty cycle. The 0° clock signal 130 is in phase with the MC clock signal sent over the clock line 116. In some embodiments, the 0° clock signal 130 actually is the MC clock signal sent over the clock line 116. The 900 clock signal 130 is 90° out-of-phase with the MC clock signal sent over the clock line 116. The 180° clock signal 130 is 180° out-of-phase with the MC clock signal sent over the clock line 116. The 270° clock signal 130 is 270° out-of-phase with the MC clock signal sent over the clock line 116. All of the clocks signals 130 generally have the same or approximately the same frequency as the MC clock signal.

As described above, the 0°, 90°, 180°, and 270° clock signals 130 are used to clock the pipelines 202-208, respectively, in the read data recovery module 126. This allows the read data to be sampled at different times, and the samples are used to select one of the clock signals 130. Samples made using the selected clock signal 130 are then output as the recovered read data.

Although FIG. 3 illustrates examples of clock signals 130 used to recover read data sent across a serial interface, various changes may be made to FIG. 3. For example, the read data recovery module 126 could include more or less than four pipelines, and more or less than four clock signals 130 could be used.

FIGS. 4A through 4C illustrate an example phase selection module 128 for selecting a clock phase used to recover read data sent across a serial interface according to one embodiment of this disclosure. In particular, FIG. 4A illustrates a phase selection module 128, FIG. 4B illustrates an encoder used in the phase selection module 128, and FIG. 4C illustrates example selections of a clock phase by the encoder. The embodiment of the phase selection module 128 shown in FIGS. 4A through 4C is for illustration only. Other embodiments of the phase selection module 128 may be used without departing from the scope of this disclosure. Also, for ease of explanation, the phase selection module 128 is described as operating in the mobile device 100 of FIG. 1. The phase selection module 128 could be used in any other suitable device.

As shown in FIG. 4A, the phase selection module 128 receives the four signals 228-234 produced by the read data recovery module 126. The phase selection module 128 also receives the read active signal 280. The phase selection module 128 uses the signals 228-234 and the read active signal 280 to produce the phase select signal 292 for use by the read data recovery module 126. The phase select signal 292 could, for example, represent a two-bit signal.

In this example, the phase selection module 128 includes four AND gates 402-408, which perform logical AND operations using the signals 228-234. For example, the AND gate 402 receives the signal 228 and an inverted copy of the signal 230, and the AND gate 408 receives the signal 234 and an inverted copy of the signal 228.

The outputs of the AND gates 402-408 are provided to multiplexers 410-416, respectively. The outputs of the multiplexers 410-416 are sampled by registers 418-424, respectively. The multiplexers 410-416 receive the outputs of the AND gates 402-408 and the outputs of the registers 418-424. The multiplexers 410-416 are controlled by a control signal generated by an OR gate 428 and an AND gate 430. The OR gate 428 receives the sampled values output by the registers 418-424, and the AND gate 430 receives the output of the OR gate 428 and the read active signal 280.

The registers 418-420 are clocked by the 0° clock signal 130, and the registers 422-424 are clocked by the 180° clock signal 130. The values output by the registers 418-424 are also received at an encoder 432. The encoder 432 generates the phase select signal 292 based on the values provided by the registers 418-424. For example, the encoder 432 could generate a two-bit value identifying which of the four signals 282-288 the multiplexer 278 in the read data recovery module 126 should output.

FIG. 4B illustrates one example embodiment of the encoder 432. In this example, the encoder 432 includes inverters 452-458, OR gates 460-468, and AND gates 470-476. Collectively, these logic gates produce two values $Y_1$ and $Y_0$, which represent the phase select signal 292. In particular, the logic gates implement the following logic functions, where "&" represents a logical AND operation and "|" represents a logical OR operation:

$$Y_1 = A | (\overline{A} \& \overline{B} \& \overline{C} \& D) | \overline{(A|B|C|D)}$$

$$Y_0 = A | (\overline{A} \& \overline{B} \& C) | \overline{(A|B|C|D)}$$

where A, B, C, and D represent the four inputs to the encoder 432. These logic functions implement the functionality shown in the following truth table, where "0" represents a logic low value, "1" represents a logic high value, and "x" represents an unknown logic value.

TABLE 1

| A | B | C | D | $Y_1$ | $Y_0$ |
|---|---|---|---|---|---|
| 1 | x | x | x | 1 | 1 |
| 0 | 1 | x | x | 0 | 0 |
| 0 | 0 | 1 | x | 0 | 1 |
| 0 | 0 | 0 | 1 | 1 | 0 |
| 0 | 0 | 0 | 0 | 1 | 1 |

In general, an MPL Level-0 serial interface drives an MD data line (such as data lines 118-120) to logic high when the data line is idle. Read data on the data line is preceded by a transition from the idle logic high value to a logic low value representing a start bit. The phase selection module 128 operates so that the selected clock signal 130 used to recover the read data is as far away as possible from this transition.

When a data line is idle (logic high), all of the AND gates 402-408 produce logic low outputs. When a start bit occurs on the data line (logic low), one of the AND gates 402-408 produces a logic high output. The logic of the encoder 432 operates to identify the where the transition occurs and to select the clock phase that is farthest from the transition. The operation of the encoder 432 is illustrated in FIG. 4C.

If the signal 228 is logic high and the signal 230 is logic low, this indicates that the transition (a falling edge) occurs between 0° and 90°. In that case, the 270° pipeline (pipeline 208) is used to recover the read data. If the signal 230 is logic high and the signal 232 is logic low, this indicates that the transition occurs between 90° and 180°, and the 0° pipeline (pipeline 202) is used to recover the read data. If the signal 232 is logic high and the signal 234 is logic low, this indicates that the transition occurs between 180° and 270°, and the 90° pipeline (pipeline 204) is used to recover the read data. If the signal 234 is logic high and the signal 230 is logic low, this indicates that the transition occurs between 270° and 0°, and the 180° pipeline (pipeline 206) is used to recover the read data.

Each of the AND gates 402-408, 430, and 470-476 includes any suitable structure for performing logical AND operations. Each of the multiplexers 410-416 includes any suitable structure for selecting one of multiple inputs for output. Each of the registers 418-424 includes any suitable structure for sampling a signal, such as a latch or D flip-flop. Each of the OR gates 428 and 460-468 includes any suitable structure for performing logical OR operations. Each of the inverters 452-458 includes any suitable structure for inverting a signal. The encoder 432 includes any suitable structure for encoding a phase select signal for use by the read data recovery module 126.

Although FIGS. 4A through 4C illustrate one example of a phase selection module 128 for selecting a clock phase used to recover read data sent across a serial interface, various changes may be made to FIGS. 4A through 4C. For example, the logic shown in FIGS. 4A and 4B are for illustration only. Other logic could also be used in the phase selection module 128. Also, a different number of pipelines could be used in the read data recovery module 126, and the phase selection module 128 could receive a different number of signals representing a different number of out-of-phase clock signals 130. Further, different clock phases could be selected in FIG. 4C, such as by selecting the 180° clock phase when the transition occurs between 0° and 90°. In addition, the functional divisions shown in FIGS. 4A through 4C are for illustration only. Various components in FIGS. 4A through 4C could be omitted, combined, or further subdivided according to particular needs.

Figure 5:
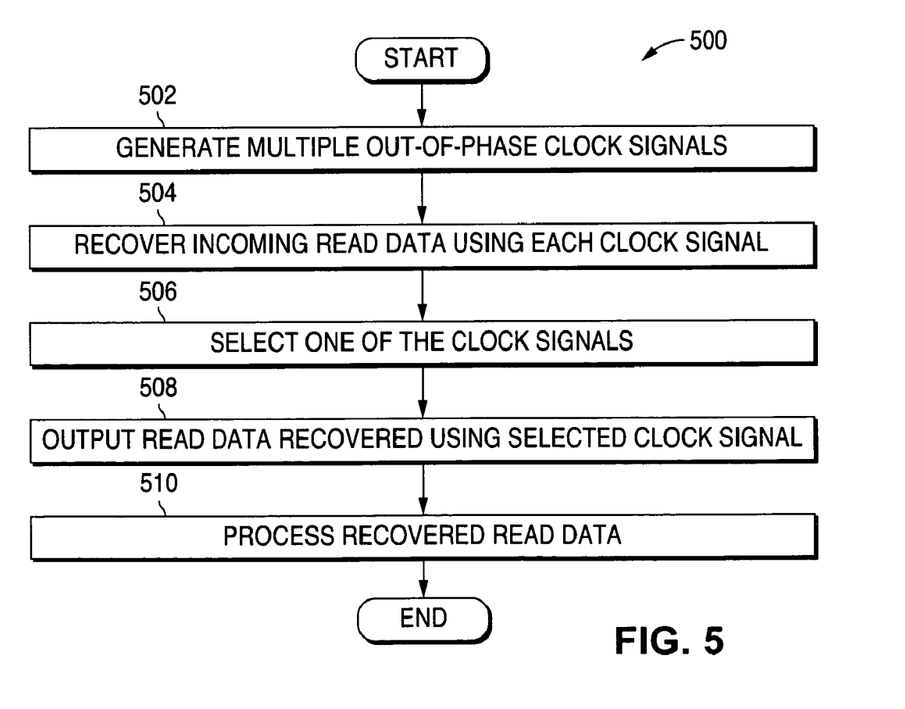
FIG. 5 illustrates an example method for read data recovery in a serial interface according to one embodiment of this disclosure.

FIG. 5 illustrates an example method 500 for read data recovery in a serial interface according to one embodiment of this disclosure. For ease of explanation, the method 500 is described with respect to the mobile device 100 shown in FIG. 1. The method 500 could also be used in any other suitable system.

The mobile device 100 generates multiple out-of-phase clock signals at step 502. This may include, for example, the clock generator 124 generating a clock signal 130, which is used as the MC clock signal sent over the clock line 116. This may also include the clock generator 124 generating three additional clock signals 130 that are 90°, 180°, and 270° out-of-phase with the MC clock signal.

The mobile device 100 recovers incoming read data using each of the clock signals at step 504. This may include, for example, the read data recovery module 126 sampling the incoming read data using different registers that are clocked by the different clock signals 130.

The mobile device 100 selects one of the clock signals at step 506. This may include, for example, the phase selection module 128 detecting a high-to-low transition in the signal received over the data lines 118-120. This may also include the phase selection module 128 selecting one of the clock phases based on the detected location of the high-to-low transition.

The mobile device 100 then outputs the read data recovered using the selected clock signal at step 508. This may include, for example, the read data recovery module 126 outputting the samples of the incoming read data that were produced using the selected clock signal.

The mobile device 100 further processes the recovered read data at step 510. This may include, for example, the processor 108 receiving the recovered read data and using the recovered read data to perform any suitable function.

Although FIG. 5 illustrates one example of a method 500 for read data recovery in a serial interface, various changes may be made to FIG. 5. For example, some of the steps shown in FIG. 5 may overlap, such as when the clock is selected at step 506 while read data is still being recovered at step 504.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   generating a plurality of out-of-phase clock signals;
   generating samples of an incoming data signal, a plurality of samples generated using each of the plurality of clock signals;
   selecting one of the plurality of clock signals; and
   providing the samples generated using the selected clock signal;
   wherein generating the samples of the incoming data signal comprises:
      sampling the incoming data signal using first registers, each of the clock signals clocking one or more of the first registers;
      sampling outputs of the first registers using second registers, each of only a subset of the clock signals clocking one or more of the second registers; and
      sampling outputs of the second registers using third registers, only one of the clock signals clocking the third registers.

2. The method of claim 1, further comprising:
   receiving the incoming data signal over a serial interface.

3. The method of claim 2, wherein:
   the serial interface comprises a clock line and one or more data lines;
   the clock line is configured to transport a main clock signal; and
   the one or more data lines are configured to transport one or more data signals.

4. The method of claim 2, wherein the serial interface comprises a Mobile Pixel Link Level Zero serial interface.

5. The method of claim 1, wherein:
   the plurality of out-of-phase clock signals comprises at least four out-of-phase clock signals; and
   only two of the clock signals are used to clock the second registers.

6. The method of claim 5, wherein the plurality of clock signals comprises:
   a first clock signal;
   a second clock signal that is approximately 90° out-of-phase with respect to the first clock signal;
   a third clock signal that is approximately 180° out-of-phase with respect to the first clock signal; and
   a fourth clock signal that is approximately 270° out-of-phase with respect to the first clock signal.

7. The method of claim 6, wherein the first clock signal is approximately 0° out-of-phase with respect to a main clock signal received over a serial interface.

8. The method of claim 6, wherein:
   the first and third clock signals clock the second registers; and
   the first clock signal clocks the third registers.

9. The method of claim 6, wherein selecting one of the plurality of clock signals comprises:
   identifying a transition in the incoming data signal, the transition occurring between samples associated with two of the clock signals; and
   selecting another of the clock signals based on the two clock signals associated with the identified transition.

10. The method of claim 9, wherein:
    the fourth clock signal is selected if the transition occurs between samples generated using the first and second clock signals;
    the first clock signal is selected if the transition occurs between samples generated using the second and third clock signals;
    the second clock signal is selected if the transition occurs between samples generated using the third and fourth clock signals; and
    the third clock signal is selected if the transition occurs between samples generated using the first and fourth clock signals.

11. An apparatus, comprising:
    a clock generator configured to generate a plurality of out-of-phase clock signals;
    a data recovery module configured to generate samples of an incoming data signal, a plurality of samples generated using each of the plurality of clock signals; and
    a selection module configured to select one of the plurality of clock signals;
    wherein the data recovery module is configured to output the samples generated using the selected clock signal; and
    wherein the data recovery module comprises:
       a plurality of first registers configured to sample the incoming data signal, each of the clock signals clocking one or more of the first registers;
       a plurality of second registers configured to sample outputs of the first registers, each of only a subset of the clock signals clocking one or more of the second registers;
       a plurality of third registers configured to sample outputs of the second registers, only one of the clock signals clocking the third registers; and
       a multiplexer configured to select an output from one of the third registers.

12. The apparatus of claim 11, wherein:
the data recovery module is configured to receive the incoming data signal over a serial interface;
the interface comprises a clock line and one or more data lines;
the clock line is configured to transport a main clock signal; and
the one or more data lines are configured to transport one or more data signals.

13. The apparatus of claim 11, wherein:
the plurality of out-of-phase clock signals comprises at least four out-of-phase clock signals; and
only two of the clock signals are used to clock the second registers.

14. The apparatus of claim 13, wherein the plurality of clock signals comprises:
a first clock signal;
a second clock signal that is approximately 90° out-of-phase with respect to the first clock signal;
a third clock signal that is approximately 180° out-of-phase with respect to the first clock signal; and
a fourth clock signal that is approximately 270° out-of-phase with respect to the first clock signal.

15. The apparatus of claim 14, wherein:
the first and third clock signals clock the second registers; and
the first clock signal clocks the third registers.

16. The apparatus of claim 14, wherein the selection module comprises:
logic configured to identify a transition in the incoming data signal, the transition occurring between samples associated with two of the clock signals; and
an encoder configured to select another of the clock signals based on the two clock signals associated with the identified transition and to provide a control signal to the multiplexer.

17. The apparatus of claim 16, wherein:
the fourth clock signal is selected if the transition occurs between samples generated using the first and second clock signals;
the first clock signal is selected if the transition occurs between samples generated using the second and third clock signals;
the second clock signal is selected if the transition occurs between samples generated using the third and fourth clock signals; and
the third clock signal is selected if the transition occurs between samples generated using the first and fourth clock signals.

18. A mobile device, comprising:
a processor;
one or more displays;
a serial interface coupling the processor and the one or more displays;
a clock generator configured to generate a plurality of out-of-phase clock signals;
a data recovery module configured to generate samples of an incoming data signal transported over the serial interface, a plurality of samples generated using each of the plurality of clock signals; and
a selection module configured to select one of the plurality of clock signals;
wherein the data recovery module is configured to provide the samples generated using the selected clock signal to the processor.

19. The mobile device of claim 18, wherein at least one of the clock generator, the data recovery module, and the selection module form part of the serial interface.

20. The mobile device of claim 18, wherein the plurality of clock signals comprises:
a first clock signal;
a second clock signal that is approximately 90° out-of-phase with respect to the first clock signal;
a third clock signal that is approximately 180° out-of-phase with respect to the first clock signal; and
a fourth clock signal that is approximately 270° out-of-phase with respect to the first clock signal.

21. The mobile device of claim 18, wherein the plurality of out-of-phase clock signals comprises at least four out-of-phase clock signals, and wherein the data recovery module comprises:
a plurality of first registers configured to sample the incoming data signal, each of the clock signals clocking one or more of the first registers;
a plurality of second registers configured to sample outputs of the first registers, each of only a subset of the clock signals clocking one or more of the second registers;
a plurality of third registers configured to sample outputs of the second registers, only one of the clock signals clocking the third registers; and
a multiplexer configured to select an output from one of the third registers.

* * * * *

UNITED STATES PATENT AND TRADEMARK OFFICE
CERTIFICATE OF CORRECTION

PATENT NO. : 7,643,593 B1  Page 1 of 1
APPLICATION NO. : 11/250591
DATED : January 5, 2010
INVENTOR(S) : Robert L. Macomber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this

Twenty-first Day of December, 2010

David J. Kappos
*Director of the United States Patent and Trademark Office*